/12/87 -E 32,419

United States Patent [19]

Rooney

[11] E Patent Number: Re. 32,419

[45] Reissued Date of Patent: May 12, 1987

[54] MOLDED KEYBOARD AND METHOD OF FABRICATING SAME

[75] Inventor: Craig E. Rooney, Prairie Village, Kans.

[73] Assignee: Engineering Research Applications, Inc., Prairie Village, Kans.

[21] Appl. No.: 822,866

[22] Filed: Jan. 27, 1986

Related U.S. Patent Documents

Reissue of:

[64] Patent No.: 4,359,613
Issued: Nov. 16, 1982
Appl. No.: 244,054
Filed: Mar. 16, 1981

[51] Int. Cl.[4] ..... H01H 13/70

[52] U.S. Cl. ..... 200/5 R; 235/145 R; 340/365 R; 340/365 F; 400/472; 400/477

[58] Field of Search ..... 84/1.15, DIG. 7; 178/17 A, 17 R, 79, 33 R; 179/190 R; 200/1 R, 5 R, 5 A, 5 E, 17 R, 67 D-67 DB, 153 R, 159 A, 159 B, 160, 308, 329, 330, 339, 340; 400/80, 52, 62, 104, 164.2, 187, 466, 472, 477-479, 481, 495, 495.1, 666; 235/145 R; 310/330; 340/345, 365 R, 365 A, 365 E, 365 P, 365 S

[56] References Cited

U.S. PATENT DOCUMENTS

| | | | |
|---|---|---|---|
| 232,692 | 9/1880 | Da Costa | 400/666 |
| 259,825 | 6/1882 | Davis | 200/159 A |
| 1,882,106 | 10/1932 | Wise | 179/190 R |
| 1,953,066 | 4/1934 | Griffith | 178/33 R |
| 2,262,777 | 11/1941 | Roper | 200/159 B |
| 2,320,774 | 6/1943 | Flynt | 200/5 E |
| 2,408,754 | 10/1946 | Bush | 178/179 |
| 2,641,753 | 6/1953 | Oliwa | 340/345 |
| 2,684,418 | 7/1954 | Koch | 200/153 R |
| 2,891,649 | 6/1959 | Peterson | 400/187 |
| 2,909,092 | 10/1959 | De Armond et al. | 84/1.15 |
| 2,978,086 | 4/1961 | Hickerson | 400/164.2 |
| 3,017,463 | 1/1962 | Dinsmore et al. | 178/79 |
| 3,018,332 | 1/1962 | Johnson et al. | 178/17 A |
| 3,032,163 | 5/1962 | Flieg | 400/80 |
| 3,104,388 | 9/1963 | Balenger | 340/345 |
| 3,107,771 | 10/1963 | Debus | 400/466 |
| 3,120,584 | 2/1964 | Grunfelder et al. | 200/5 E |
| 3,133,170 | 5/1964 | Nanninga | 200/67 DB |
| 3,189,153 | 6/1965 | Barnard et al. | 400/478 |
| 3,191,740 | 6/1965 | Smusz et al. | 400/52 |
| 3,233,715 | 2/1966 | Flieg | 400/62 |
| 3,234,331 | 2/1966 | Holstein et al. | 178/179 |
| 3,241,648 | 3/1966 | Stenudd | 400/104 |

(List continued on next page.)

FOREIGN PATENT DOCUMENTS

| | | |
|---|---|---|
| 1070231 | 6/1967 | United Kingdom . |
| 1171082 | 11/1969 | United Kingdom . |
| 1330742 | 9/1973 | United Kingdom . |
| 1348007 | 3/1974 | United Kingdom . |

(List continued on next page.)

OTHER PUBLICATIONS

N. K. Perkins, et al., "Molded Spring Keyboard", *IBM Technical Disclosure Bulletin*, vol. 23, No. 10, pp. 4548-4549, 1981, New York.

(List continued on next page.)

*Primary Examiner*—J. R. Scott
*Attorney, Agent, or Firm*—Schmidt, Johnson, Hovey & Williams

[57] ABSTRACT

A moldable, impulse operation synthetic resin keyboard, and a method of fabricating the same, are provided wherein the keyboard achieves essentially standard, tactile feed and feedback, mechanical N-key rollover protection and precise, reliable output. The keyboard includes a synthetic resin base plate having a plurality of elongated, cantilever mounted flippers, along with a plurality of elongated, laterally spaced, inwardly and opposedly extending, pivotal, key-supporting arms. Upon depression of a key, the associated flipper is deformed until a release point is reached, whereupon the flipper is disengaged, allowing the flipper to quickly return to its rest position. A keyboard output is developed as the flipper, during overtravel thereof past its rest position, strikes a signal-generating assembly.

25 Claims, 21 Drawing Figures

U.S. PATENT DOCUMENTS

| | | | |
|---|---|---|---|
| 3,290,439 | 12/1966 | Willcox et al. | 178/17 R |
| 3,294,927 | 12/1966 | Hill | 200/5 R |
| 3,337,076 | 8/1967 | Ast | 220/3.6 |
| 3,353,038 | 11/1967 | Mason et al. | 310/330 |
| 3,369,643 | 2/1968 | Avgerinos et al. | 400/478 |
| 3,472,974 | 10/1969 | McGough | 200/5 R |
| 3,579,047 | 5/1971 | Sturm et al. | 250/221 |
| 3,600,528 | 8/1971 | Leposavic | 200/5 A |
| 3,603,756 | 9/1971 | Carpentier et al. | 200/159 B |
| 3,603,983 | 9/1971 | Mitchell | 340/365 A |
| 3,617,627 | 11/1971 | McLean | 178/17 R |
| 3,627,935 | 12/1971 | Spievak | 200/5 R |
| 3,632,937 | 1/1972 | Nanninga | 200/160 |
| 3,700,087 | 10/1972 | Ahrns | 400/477 |
| 3,707,609 | 12/1972 | Dapot et al. | 200/5 R |
| 3,717,235 | 2/1973 | Dannatt | 400/477 |
| 3,723,673 | 3/1973 | Clary et al. | 200/5 A X |
| 3,725,908 | 4/1973 | Brisebarre et al. | 340/365 A |
| 3,731,014 | 5/1973 | Brady | 200/5 A |
| 3,746,802 | 7/1973 | Sandi et al. | 200/5 E |
| 3,750,150 | 7/1973 | Cramer et al. | 340/365 P |
| 3,800,104 | 3/1974 | Lien et al. | 200/5 A |
| 3,811,024 | 5/1974 | Sevigny | 200/160 |
| 3,818,485 | 6/1974 | Harrison et al. | 340/365 P |
| 3,829,646 | 8/1974 | Lorteije et al. | 200/159 B |
| 3,899,648 | 8/1975 | Murata | 200/5 R |
| 3,909,564 | 9/1975 | Scheingold et al. | 200/5 E |
| 3,916,135 | 10/1975 | Holden et al. | 200/339 |
| 3,941,953 | 3/1976 | Misson et al. | 200/5 R |
| 3,947,390 | 3/1976 | Johnson | 200/5 R |
| 3,971,902 | 7/1976 | Wulf et al. | 200/5 A |
| 3,978,297 | 8/1976 | Lynn et al. | 200/5 A |
| 3,982,081 | 9/1976 | Demler, Jr. | 200/5 R |
| 3,995,126 | 11/1976 | Larson | 200/5 A |
| 4,066,860 | 1/1978 | Kawasaki | 200/308 |
| 4,258,356 | 3/1981 | Jalbert | 340/365 R |

FOREIGN PATENT DOCUMENTS

| | | |
|---|---|---|
| 1386070 | 3/1975 | United Kingdom . |
| 1420581 | 1/1976 | United Kingdom . |
| 1468036 | 3/1977 | United Kingdom . |

OTHER PUBLICATIONS

*Popular Science;* Free, John; "Electronic Typewriter Has Ultrasonic Keyboard"; Mar., 1981; p. 75.

IBM Technical Disclosure Bulletin; Lynott, J. J.; "Photo Keyboard"; vol. 3, No. 11, Apr. 1961, p. 44.

IBM Technical Disclosure Bulletin; Taris, J. A.; "Keyboard"; vol. 8, No. 8, Jan. 1966, p. 1064.

Electrical Design News (EDN); "Reliable and Flexible Keyboards Feature Optical Input Detection"; Apr. 5, 1980, p. 146.

Electrical Design News (EDN); Larson, Willis; "Effective Membrane Switches Need More Than Good Looks"; Jan. 20, 1980, p. 147.

*HI-TEK Keyboards* catalog; 4 pages.

SABRECOIL ® Keyboard catalog; Mechanical Enterprises, Inc., 8 pages.

Reprint from Dupont Magazine, vol. 73, No. 6; Nov.–Dec. 1979 issue; Chromerics, Inc.; "Keyboards by the Mile", 8 pages.

K-B Denver Inc., *Tactile Switch Keyboard* catalog, Oct. 1979, 7 pages.

STACKPOLE Keyswitches, Keyboards and Arrays (Preliminary Data Sheet), 9-1979, 3 pages.

TEC, Inc.; Your Complete Source for Keyboards; 9-1979; 5 pages.

*Product Index & Directory,* eem/1977, pp. 224, 1480, 2671, 3999, 4000, 4065, 4082, 4083, 4154, 4155, 4158, 4184, 4227 and 4310.

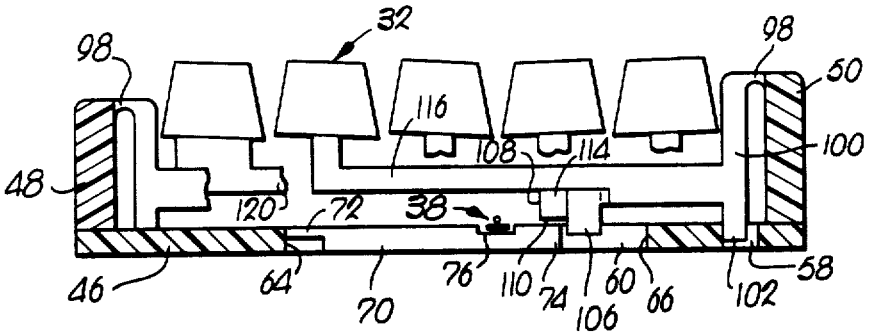
Fig.8.
Fig.9.
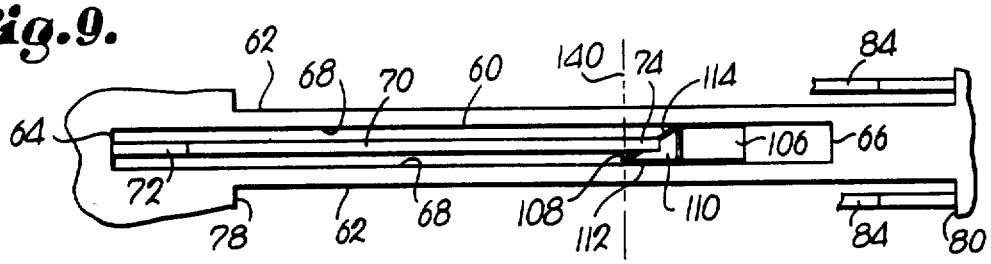
Fig.10.
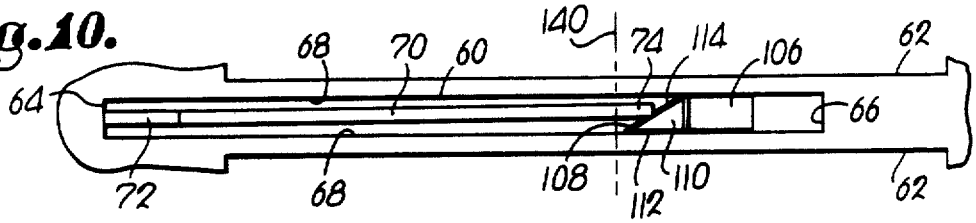
Fig.11.
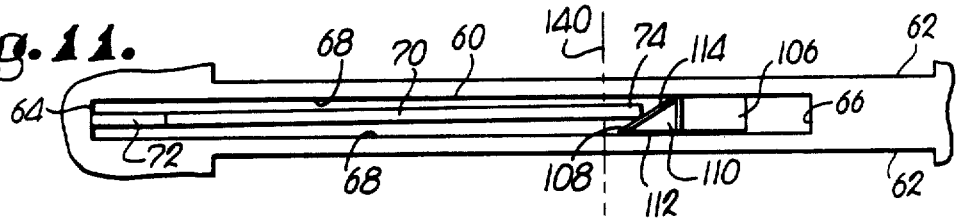
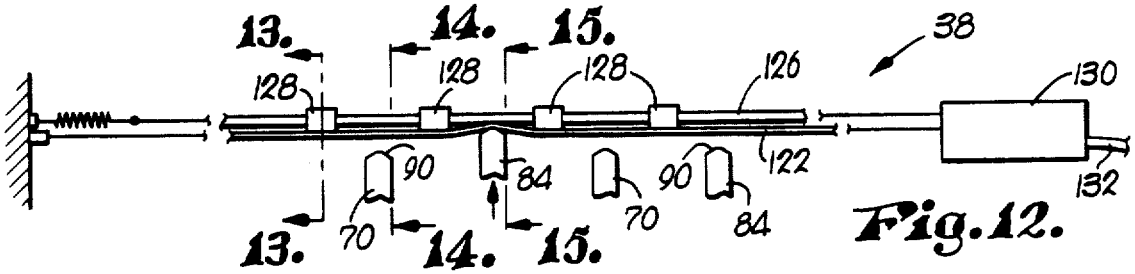
Fig.12.
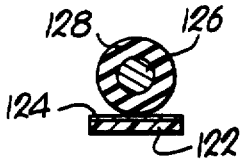
Fig.13.
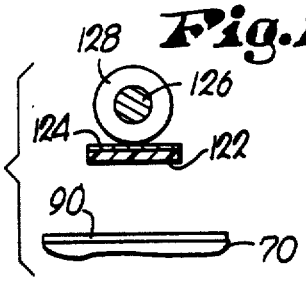
Fig.14.
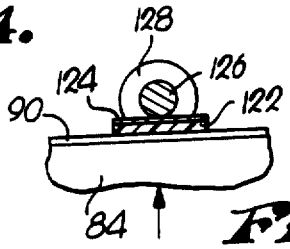
Fig.15.

MOLDED KEYBOARD AND METHOD OF FABRICATING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is concerned with an improved, low cost keyboard preferably formed of moldable synthetic resin material and which has a substantial degree of mechanical N-key rollover protection and other necessary features making the keyboard applicable for a wide variety of uses. More particularly, it is concerned with such a keyboard having a momentary impulse output operation, standard tactile feedback and the ability to handle high speed inputs without difficulty.

[Attention is directed to pending application for U.S. Letters Patent Ser. No. 06/190,177, Filed: Sept. 24, 1980; this application is hereby incorporated by reference into the instant application.]

*Attention is directed to application Ser. No. 06/190,177, Filed Sept. 24, 1980, now U.S. Pat. No. 4,359,612. This patent is hereby incorporated by reference into the instant application.*

2. Description of the Prior Art

Keyboards are most commonly associated with typewriters and have until recent times developed in parallel with typewriter evolution. However, with the advent of the electronic age, a new generation of keyboards suitable for use as instruction keys for electronically activated devices has evolved. These keyboards have a wide array of uses, only one of which is to input electronic typewriters.

In the present state of the art, there are basically three types of keyboards. In one variety, electronic output in the form of electrically encoded signals to a companion or remote device is employed. In another type of keyboard, mechanical output movements are used which trip or activate leverages or linkage in either totally mechanical machines (e.g., manual typewriters) or electric machines such as electric typewriters. The principal distinguishing feature between these two types of keyboards is the form of output, i.e., mechanical movement or electric signal.

The third type of general keyboard construction can be thought of as a hybrid between the electronic and mechanical units. In this form, a mechanically induced movement is read electronically by one of various kinds of transducers, and the reader outputs the detected movement in the form of signals of an electronic nature.

While it is true that the keyboard art is old and well developed, the relatively recent proliferation of electronic devices that require operator instruction has caused the manufacturing of keyboards to grow at an enormous rate. Keyboards are required in all sizes, configurations, colors, shapes, tilts, slants, legends, codings, key strokes and depths. Despite this industry growth, or perhaps as a result thereof, no one keyboard or variety of keyboard has emerged as clearly superior. This is primarily due to the operational or cost limitations inherent in the various keyboard constructions, as well as the difficulty of modifying the same for particular purposes.

For example, in the case of full keystroke keyboards, the depth of the keyboard structure becomes a problem in many cases. The standard key switch plunger arrangement or mechanical leverage linkage consumes a considerable depth, because of the structural constraints encountered in developing a proper key stroke (approximately 3/16 of an inch) with acceptable key wiggle, direct depression travel, proper chassis and mounting cannister for either the key switch plunger or the leverage that attaches to the key stem. This in addition to the height of the key top itself necessitates a rather large, bulky overall keyboard structure. Because of the foregoing problems, full stroke keyboards are generally limited to conventional typewriters or input/output devices, and are not used on other types of equipment. Manifestly, the problem of providing a full stroke keyboard with minimum depth has limited the market potential of prior full stroke keyboards.

Virtually all known keyboards with key stroke capability require separate key tops. This is a fundamental requirement of the plunger or lever structure used as the key top support. The present industry standard for key tops on reliable equipment is double injection molded synthetic resin key tops. In this form, the key tops are first molded in one color of synthetic resin and an inner shell space is allowed for a second color injection that results in key legending being injected completely through the outer key shell. This process is inherently expensive in many ways. For example, it requires two complete injection runs for manufacture of the keytops, using expensive molding equipment which cannot be altered except at great expense. The double molding operation also results in a key top that is of substantial thickness and consumes a considerable amount of material.

The primary use of full stroke keyboards is in graphics and typewriting, including computer and CRT units. However, the bulk of the potential market for typewriter and printer equipment has grown accustomed to the tactile feel of conventional electric typewriters. These devices have feedback as a consequence of their design and mechanical construction. Tactile feedback in this context refers to a slight pressure increase required to depress a key through the initial range of key stroke, followed by a breakaway at about two-thirds of the stroke depth that is felt by the operator. This breakaway change from one pressure to a lighter pressure is not mimicked in any electronic keyboard in common usage, and accordingly this latter type of keyboard is deficient in this respect. In order to fully meet market demand and appeal to an already trained public, a keyboard form should include tactile feedback. Moreover, the amount of feedback should be variable without significant or costly manufacturing changes, in order to meet differing uses.

With touch typing at high speed on a conventional typewriter keyboard a phenomenon occurs which is referred to as "rollover." While typing at high speed, one key is in initial stages of depression before the priorly depressed key is released, and in some cases there could be as many as four keys simultaneously in various stages of depression, bottom out or upward travel. There are two ways to handle this problem that are in common use, i.e., mechanical blocking or filtering, or electronic scanning or logic analysis. Typical electric typewriters with keyboards use the technique of mechanical filtering. In this scheme some form of continuous chain of elements is configured in such a way that only one key lever at a time can pass through the chain. In this manner, no two keys can be in a position to interrupt or actuate a mechanical movement simultaneously. Because of the relatively high tolerance requirements of such systems, they are inherently expensive, can actually retard the speed of the typist, and present maintenance problems in that they can become gummed up and sticky over time. The typical electronic keyboard on the other hand solves the problem in an electronic way. Normally, a keyboard matrix of the key switch positions is scanned at high frequency. The first switch to be activated is entered into memory and the second switch is then entered while the output from the first switch is ignored or blocked and so forth until "N-keys" are depressed. For this reason electronic keyboards require a substantial amount of logic circuitry, the relative amount and sophistication of the decoding and "N-key" analysis and speed of information scanning being in direct proportion to the cost of the board.

Another absolute necessity in connection with keyboards is that of reliability, i.e., the life or number of cycles which can be expected from the keyboard, and within a given number of cycles, the number of misses or fault signals that occur. The most expensive and reliable keyboards on the market today are so-called "Hall effect" keyboards. In these units key depression closes a switch which is magnetically sensed, and only a breakdown in the mechanics of the switch cannister or chassis can effect reliability of such a device. However, Hall effect keyboards are inherently very expensive by virtue of the many electronic components required, and particularly the relatively high electronic power supply requirements.

In short, it will be appreciated that the various keyboards of the prior art each possess a number of outstanding attributes, but all are plagued by one or more serious deficiencies. Accordingly, there is a real and heretofore unsatisfied need in the art for a simple, low cost keyboard having the combined properties of full stroke capability, tactile feedback, N-key roll-over protection, minimum depth, and a high degree of reliability.

SUMMARY OF THE INVENTION

The present invention is broadly concerned with a keyboard, and a method of fabricating the same, which overcomes the problems noted above. The keyboard of the invention includes a plurality of keys which are individually supported for selective depression thereof, along with means for developing a keyboard output corresponding to the depression of particular keys. The keys are operably coupled to the output means by structure including an elongated, resilient element for each key and having a shiftable operating portion, and means operably interconnecting the keys and their associated elements for shifting of the operating portions of the elements in response to depression of particular keys. The output means further include at least one output member adjacent the resilient elements and located to be engaged by the operating portions of the elements during shifting thereof. Apparatus is coupled to the output member for sensing which of the elements has engaged the same, whereupon the keyboard output is directed to utilization circuitry forming a part of the overall typewriter and/or printer.

In another aspect of the invention, a keyboard is provided having a plurality of keys with an elongated, generally horizontally extending support arms secured to each key respectively. Certain of the arms extend in a first direction, whereas others of the arms extend in a second direction different than (preferably generally opposed to) the first direction. The respective arms are mounted for pivotal movement thereof about generally horizontal axes spaced from the associated keys. In this fashion, the keys can be accommodated within a relatively narrow space, while at the same time providing the desirable keyboard "feel" and feedback of conventional typewriter keyboards.

In the most preferred form of the invention, the key-supporting arms include an engagement surface which, upon depression of the associated key, engage and deflect a resilient, synthetic resin element such as a flipper provided beneath each key in the keyboard base. The respective flippers are mounted in a cantilever fashion on the keyboard base with the free or operating ends of the flippers extending beneath the corresponding engagement surfaces. During depression of a key and consequent downward deflection of the associated flipper, the latter is deformed and experiences an increase in potential energy. The engagement surface and flipper end are cooperatively configured such that, near the bottom of the key stroke, the flipper is detended from the engagement surface and is allowed to rapidly shift or spring upwardly toward its original rest position. However, during this return travel, the flipper overtravels to a certain extent before returning to its rest configuration.

Output from the keyboard is preferably developed through the use of an elongated synthetic resin strip coated with a conductive material such as silver or silicon conductive rubber which is disposed transversely relative to the respective key-supporting arms and located to be engaged by the flippers during the described overtravel movement thereof. An elongated resistive wire is positioned above the conductive strip, in such location that the flipper serves to push the conductive strip into engagement with the resistive wire for a very short "impulse" period during the overtravel motion of the flipper. Such contact between the conductive strip and resistive wire completes an electrical circuit, and apparatus such as an analog/digital voltage converter is coupled to the strip and resistive wire for determining the magnitude of resistances developed through the wire. A predetermined resistance corresponds to each key and associated flipper, and in this fashion a precise determination can be made of which of the keys has been depressed. The output from the voltage converter is directed to utilization circuitry associated with the overall typewriter, printer or CRT.

In fabrication procedures, a keyboard blank is molded which includes a base member and a first set of elongated arms, with structure pivotally coupling the first arms to the base along one margin thereof. A key is further secured to each arm. A second set of arms is then positioned in opposed, facing relationship to the first arms, and the first and second arms are shifted toward one another until the arms are generally parallel to the base, and are pivotal about respective axes. This involves intercalating respective arms, and captively locking each arm so that it travels only through a predetermined key stroke arc.

BRIEF DESCRIPTION OF THE DRAWINGS

FIG. 8 is a view similar to that of FIG. 7, but illustrates a key having a longer arm than that of FIG. 7, with the key being in its rest position;

FIG. 9 is a fragmentary bottom view of FIG. 5, during the initial stages of key stroke depression and consequent flipper engagement;

FIG. 10 is a fragmentary bottom view of FIG. 6, illustrating the configuration of the key arm and flipper just prior to release of the flipper;

FIG. 11 is a fragmentary bottom view of FIG. 7, depicting the return travel of the flipper;

FIG. 12 is a somewhat schematic fragmentary view illustrating the preferred output assembly for developing a keyboard output;

FIG. 13 is a vertical sectional view taken along line 13—13 of FIG. 12;

FIG. 14 is a vertical sectional view taken along line 14—14 of FIG. 12;

FIG. 15 is a vertical sectional view taken along line 15—15 of FIG. 12;

DESCRIPTION OF THE PREFERRED EMBODIMENTS

Figure 1:
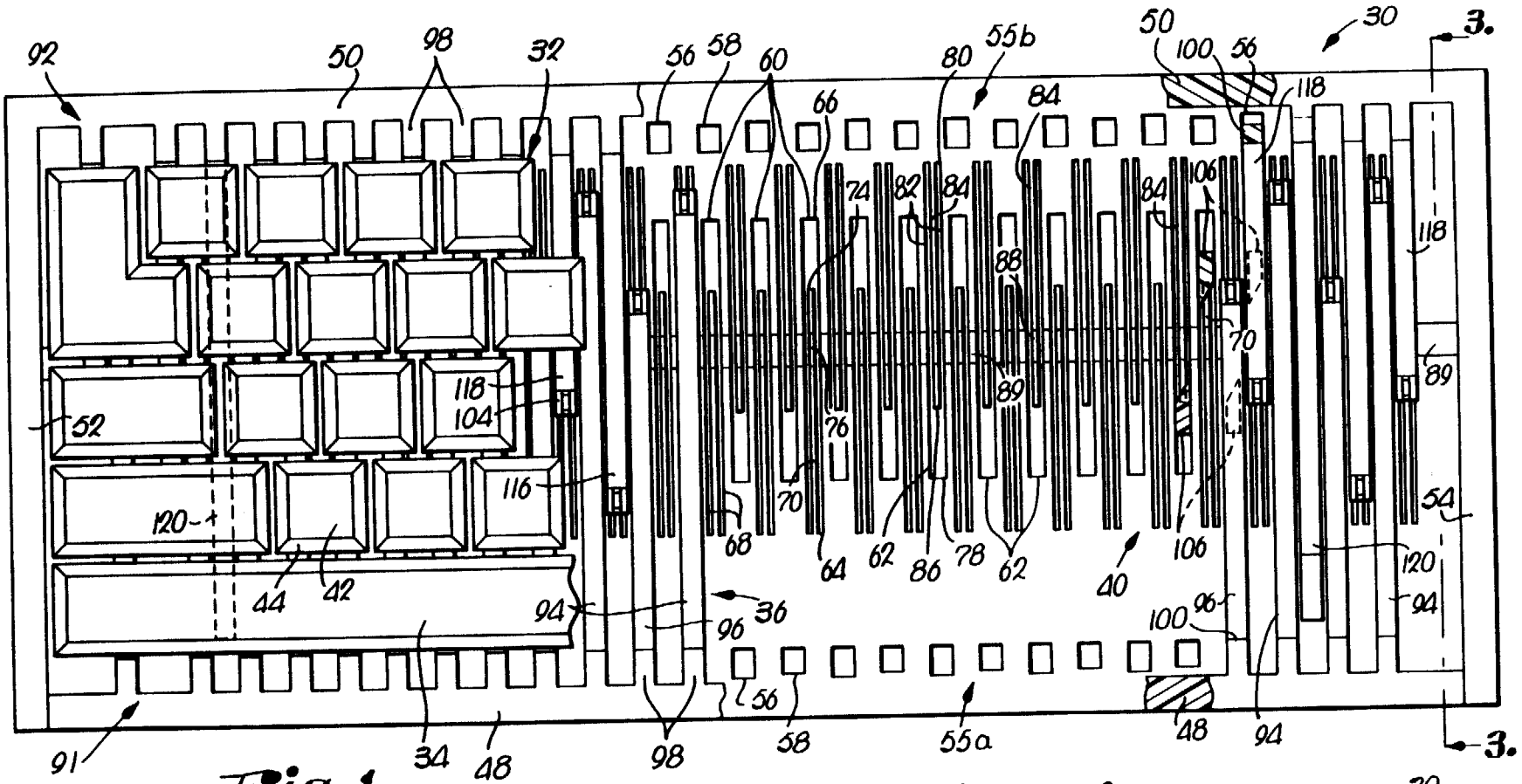
FIG. 1 is a top view of a keyboard in accordance with the invention, with parts broken away for clarity and certain parts being illustrated in section.
Figure 2:
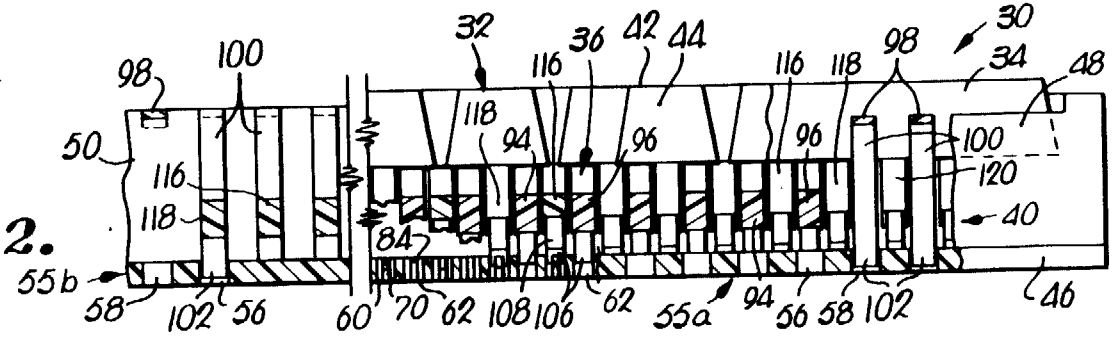
FIG. 2 is a fragmentary, irregularly broken away and partially in section front view of the keyboard depicted in FIG. 1.

Turning now to the drawings, a keyboard 30 is depicted in FIGS. 1 and 2, and broadly includes a plurality of keys 32 arranged in respective rows, along with an elongated, spanning, depressible spacing bar 34. The keyboard further has means referred to by the numeral 36 for supporting the keys 32 for individual, selective depression thereof, and means 38 (see FIG. 12) for developing a keyboard output related to the depression of particular keys. Structure 40 beneath the keys 32 is employed for operably coupling the keys and the output means 38 so that, upon depression of particular keys, a corresponding output is developed.

In more detail, each of the keys 32 is preferably formed of synthetic resin material and presents a slightly concave, uppermost finger-engagement surface 42 along with a depending, circumscribing skirt 44. The majority of the keys are essentially square in plan configuration as best seen in FIG. 1, whereas certain of the keys are oblong or L-shaped, as is conventional in present day keyboards.

The key-supporting means 36 includes a substantially planar, apertured base 46 which is rectangular in plan configuration, along with a pair of spaced, opposed, marginal front and rear walls 48 and 50, and upright, spaced, marginal sidewalls 52, 54.

The base 46 is provided with two series 55a and 55b of apertures 56 and 58 respectively adjacent and extending along the length of front and rear walls 48 and 50. It will be noted in this regard that the apertures 56, 58 alternate along the length of each wall 48, 50, and that the apertures 56 are somewhat longer than the apertures 58. In addition, it will be observed that the apertures along the length of front wall 48 are laterally offset relative to the apertures along the length of rear wall 50. The significance of these features will be made clear hereinafter.

The base 46 is also provided with a series of alternating, elongated, rectangular slots 60 and 62 therethrough which are located between the walls 48, 50. A slot 62 is provided and is in alignment with each aperture 56, 58 in the row 55a thereof proximal to front wall 48; likewise, a slot 60 is provided with and is in alignment with each aperture 56, 58 in the row 55b thereof proximal to front wall 48.

Referring specifically to FIG. 1, it will be seen that each slot 60 is defined by a front wall 64 and a rear wall 66 along with spaced, opposed sidewalls 68. An elongated, rearwardly extending, resilient, deformable flipper or element 70 is secured to the front wall 64 of each slot 60 in a cantilever fashion by means of a short, thin connection strip 72 (see FIG. 4). The free or operating end 74 of each element 70 is between the sidewall 68 and spaced from the rear wall 66. Finally, a notch 76 is provided in the upper surface of element 70 as depicted.

Each slot 62 is similar to the slots 60 and is defined by a front wall 78, rear wall 80, and spaced, opposed sidewalls 82. An elongated, resilient, deformable flipper or element 84 is secured to rear wall 80 of each slot 62 and extends forwardly toward front wall 78. Here again, the elements 84 are cantilever mounted to their respective mounting walls by means of short connection strips. The free or operating end 86 of each element 84 is spaced from the front wall 78, and the upper surface of each element 84 is notched as at 88. Notches 89 are provided in the upper face of base 46 between the slots 62 and in alignment with the element notches 76, 88, so that the notches 76, 88 and 89 cooperatively define an elongated channel extending between sidewalls 52, 54. Finally, the upper surfaces of the notched regions of the elements 70, 84 are peaked as at 90 (see FIGS. 12-15).

As best seen in FIG. 1, the front walls 64 of the slots 60 are closer to the apertures 56, 58 adjacent front wall 48, than are the front walls 78 of the slots 62. By the same token, the rear walls 80 of the slots 62 are closer to the apertures 56, 58 proximal to rear wall 50, than are the rear walls 66 of the slots 60. Also, it will be seen that the respective elements 70, 84, respectively associated with each slot 60 or 62 are cantilever mounted and extend in opposite direction relative to one another. However, the notches 76, 88 provided in the element 70, 84 are in alignment with one another for purposes to be made clear.

Figure 3:
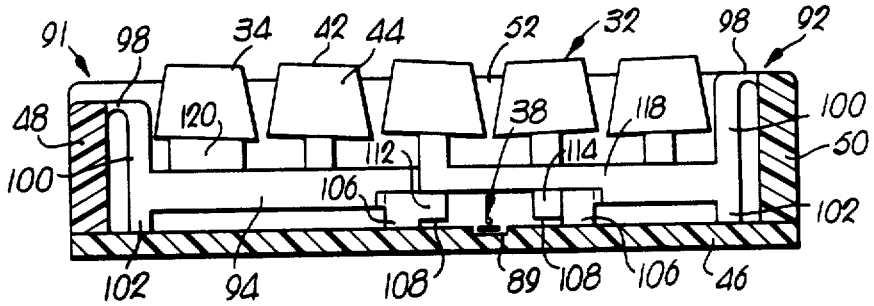
FIG. 3 is a vertical sectional view taken along line 3—3 of FIG. 1.

The key-supporting means 36 further includes two sets 91 and 92 of elongated key arms respectively pivotally coupled to the walls 48, 50. Set 91 includes alternating longer and shorter arms 94 and 96 which are oriented in laterally spaced relationship along the length of wall 48. The longer arms 94 are located directly above the apertures 58, whereas the shorter arms 96 are located directly above the apertures 56. As best seen in FIG. 1, each of the arms 94, 96, extends over a portion of an associated slot 62 and element 84 therein. Referring to FIGS. 1-3, it will be seen that each of the arms 94, 96 are pivotally connected to the upper margin of wall 48 by means of a thin, synthetic resin hinge portion 98. A depending leg 100 extends from the end of hinge portion 98 remote from wall 48, and has a lowermost dog 102 thereon. The dog 102 is inserted and captively retained whithin the adjacent, associated aperture 56 or 58 directly beneath the hinge portion 98. An elongated arm 94, 96 extends from the leg 100 above dog 102 to a point for supporting a key 32. To this end, the ends of the arms 94, 96 are provided with upstanding frictional connector 104 for receiving and supporting an associated key 32.

A depending retainer 106 is secured to each arm 94, 96 and extends downwardly therefrom and is received within the associated underlying slot 62 in order to prevent significant lateral wiggle of the arms and their supported keys. Specifically, the retainer 106 fits in the open portion of underlying slot 62 between the extreme free end of the element 84 and front wall 78.

A beveled flipper-engaging member 108 is also provided with each arm 94, 96, directly inboard of the retainer 106. The member 108 includes a substantially triangular bottom wall 110 disposed partially above the end 86 of the element 84, an upright planar sidewall 112, and a beveled, substantially planar sidewall 114. The importance of this construction will be explained hereinafter.

The set of arms 92 is operatively coupled to rear wall 50 such that the arms 116, 118 thereof are laterally spaced apart and extend toward front wall 48. Here again, the longer arms 116 alternate with the shorter arms 118; and the longer arms 116 are disposed over and operatively coupled with an aperture 58 in set 55b, whereas the shorter arms 118 are disposed over and coupled to an underlying aperture 56.

The arms 116, 118, are coupled to their associated wall 50 in a manner identical to that described in conjunction with the arms 94, 96 of set 91. That is to say, a hinge portion 98 and depending leg 100 having a dog 102 are provided for each arm, with the dog 102 being inserted within the associated aperture 56 or 58 for the arm. Likewise, each of the arms 116, 118 includes a depending retainer 106 received within a slot 60 between the free end of the element 70 therein and the defining front wall 64. Finally, each of the arms 116, 118 includes an element-engaging member 108 which is identical to that described in connection with the arms 94, 96, both in the structure thereof and in disposition relative to the associated underlying elements 70.

Again referring to FIG. 1, it will be seen that the longer arms 116 support the row of keys closest to front wall 48; whereas the shorter arms 118 support the next inboard row of keys. Thus, the arms 94, 96 of set 91 extend in an opposed direction relative to the arms 116, 118 of set 92. Also, the arms are intercalated so that arms from set 91 alternate with arms from the opposing set 92.

Spacing bar 34 is supported for up and down movement thereof by means of a pair of elongated, spaced apart arms 120 which extend from rear wall 50 forwardly to a point just adjacent front wall 48. The arms 120 are pivotally mounted for movement about a horizontal axis so that the bar 34 moves in the conventional fashion.

Output means 38 (see FIG. 12) includes an elongated, resilient, synthetic resin strip 122 having a conductive coating of conductive rubber 124 on the upper face thereof. The strip 122 is mounted within the channel defined by the aligned notches 76, 88 and 89. It will thus be appreciated that the strip 122 extends above and transversely relative to the longitudinal axes of the respective elements 70, 84, and below the arms 94, 96 and 116, 118.

The output means 38 further includes an elongated, resistive wire 126 preferably formed of so-called "Nichrome" material. The wire 126 is located slightly above and extends along the length of the strip 122. A plurality of spaced apart tubular insulators 128 are provided on wire 126 and respectively straddle the underlying elements 70, 84. An analog/digital voltage converter 130 provided with a suitable reference voltage source (not shown) is operatively coupled to the wire 126 and conductive coating 124 such that, when one of the elements 70, 84 moves in a manner to engage a zone on the strip 122 and push the latter into momentary impulse contact with wire 126, a characteristic resistance corresponding to the element (and thereby the associated key) is developed and sensed. An output cable 132 is coupled to appropriate utilization circuitry (not shown) forming a part of the overall typewriter or printer.

Referring again to FIG. 1, it will be seen that the arms 94 support keys 32 in the row thereof furthest from wall 48. By the same token, the shorter arms 96 support the keys forming the second row thereof spaced from rear wall 50.

The operation of keyboard 30 can best be understood from a consideration of FIGS. 4-11. In the ensuing discussion, the operation of keyboard 30 during depression of a particular key 32a supported by one of the arms 118 will be described; it will be understood, however, that the operation of the remaining keys is identical in all material respects.

Figure 4:
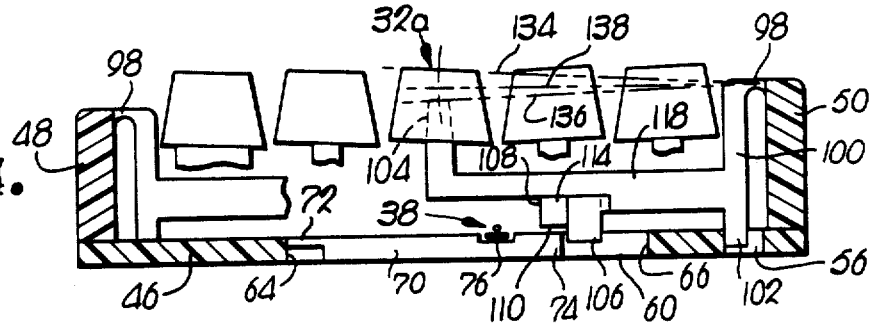
FIG. 4 is a view similar to that of FIG. 3, but illustrating the juxtaposition of the key-supporting arms and their underlying flippers, and with the limits of a key stroke arc illustrated in dotted lines on one of the keys.
Figure 5:
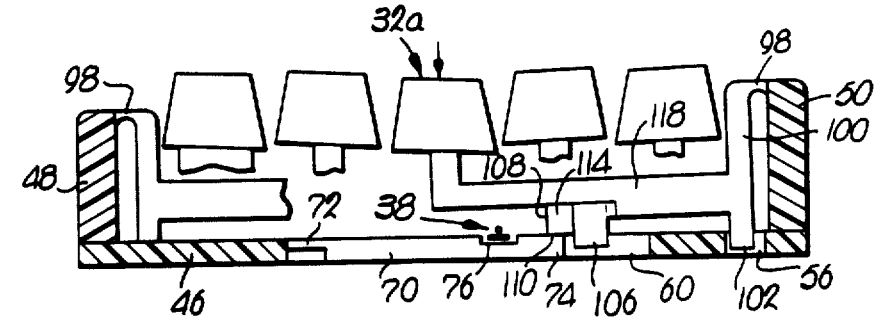
FIG. 5 is a view similar to that of FIG. 4, but illustrating the configuration of one of the keys during the initial stages of depression thereof.
Figure 6:
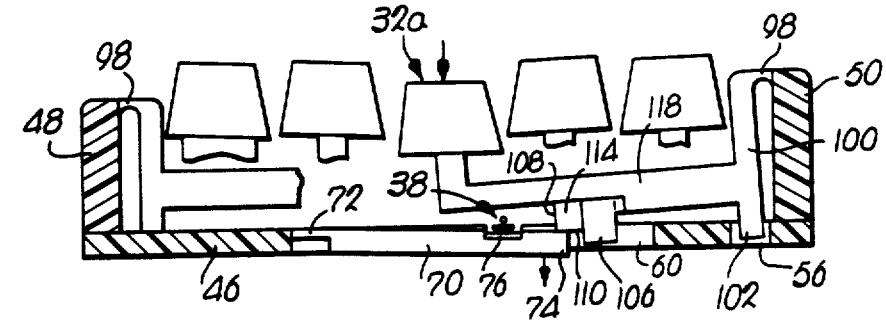
FIG. 6 is a view similar to FIG. 5, but illustrates the configuration of a depressed key prior to release of the associated flipper.

At the outset (see FIG. 4) it will be appreciated that, in the rest position of key 32a, the arm 118 extends generally horizontally relative to the base 46, and is pivotally movable by virtue of the associated hinge portion 98. In addition, the dog 102 is disposed within the underlying aperture 56 adjacent rear wall 50. The orientation of dog 102 within the aperture 56 thus limits the extent of pivotal movement of the arm 118. The limits of this pivotal movement are illustrated in FIG. 4 by means of respective sector lines 134 and 136 which define the predetermined arc of travel of the arm 118 and, consequently, the key 32a. In addition, it will be seen that the pivot axis for arm 118 is elevated above the longitudinal axis of the arm, and lies in a horizontal plane (depicted by line 138 in FIG. 4) which intersects the predetermined arc of travel of the key. It has been found that the described orientation of the pivot axis for the respective arms give a "feel" to the user which closely simulates conventional typewriter keyboards.

In any event, upon initial depression of the key 32a (see FIGS. 5 and 9), the engagement surface 110 on the member 108 comes into contact with the upper surface of free end 74 for the underlying element 70. Continued downward movement of the key under the influence of finger pressure serves to deform and deflect the end 74 of the element 70 (see FIGS. 6 and 10) downwardly, with the effect that the potential energy of the resilient element is increased, along with its resistance to further deflection.

By virtue of the pivoting action of the element-engaging member 108 and the surface 110 thereof, a point is reached where the surface 110 passes out of engagement with end 74 of element 70. This can best be understood from a consideration of FIGS. 9–11, wherein a line 140 has been applied with corresponds to the innermost extent of the number 108 prior to depression of the key 32a. As such depression proceeds, the surface 110 pivots away from the end 74 of the element 70 until, as seen in FIG. 11, the element 70 is completely disengaged from the surface 110.

Figure 7:
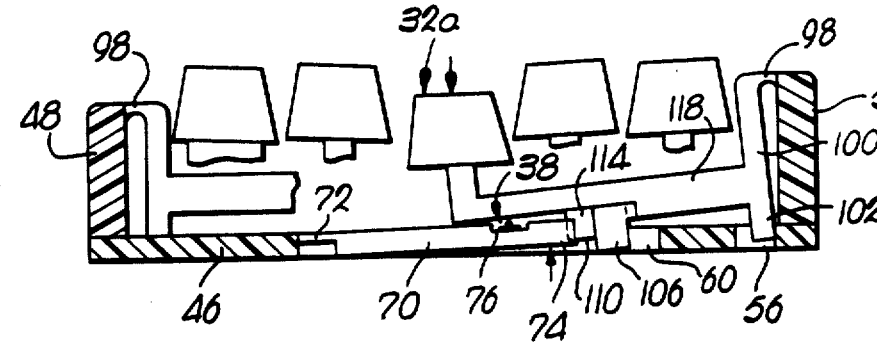
FIG. 7 is a view similar to that of FIG. 6, but illustrates the configuration of a flipper during overtravel movement thereof back to its original rest configuration.

When such disengagement occurs, the deformed and deflected element 70, because of the resilient nature thereof, springs back upwardly at a very high rate of speed toward its rest position (see FIGS. 7 and 11).

During such return movement of the element 70, the element overtravels the original starting or rest position thereof, and, during such overtravel, engages with a momentary impact the underside of the strip 122. As best seen in FIGS. 12 and 15, the overtravel movement serves to push or propel the strip upwardly till the conductive coating 124 thereon comes into a momentary pulse-type engagement with the resistive wire 126. Such impulse movement is facilitated by virtue of the peaked nature of the element at the region of the notch 76 therein, which is indicated by the reference numeral 90. In effect, the peaked sections, in conjunction with the conductive rubber coated strip 122, cause an arcuate portion of the strip to orthogonally contact the circular in cross section wire 126; such cross point contact creates a relatively high mechanical stress region at the contact point which is desirable to establish a firm, yet momentary contact pressure between the components. Further, it will be observed that contact between the strip 122 and wire 126 at multiple points is prevented by virtue of the straddling insulators 128 respectively disposed on opposite sides of the element 70.

When the zone of strip 122 directly above the element 70 is caused to engage wire 126, a circuit coupled with the converter 130 is established from the converter 130 through the portions of the coating 124 and wire 126 electrically between the converter and the contact point. The converter 130 senses the magnitude of the electrical resistance developed in the involved portion of the wire 126 during such circuit closing, and delivers a suitably corresponding electrical output (e.g., a binary encoded character code) to the cable 132. It will be appreciated in this regard that the element 70, when it closes the electrical circuit as described, presents to the converter 130 a unique, predetermined resistance magnitude corresponding to the key 32a so that the converter 130 will provide an appropriate distinctive output signal corresponding to the key 32a. By the same token, each of the remaining elements 70, 84, and their associated keys, have a unique resistance magnitude respectively associated therewith, so that the device 130 can output a proper distinctive signal in each case.

Figure 16:
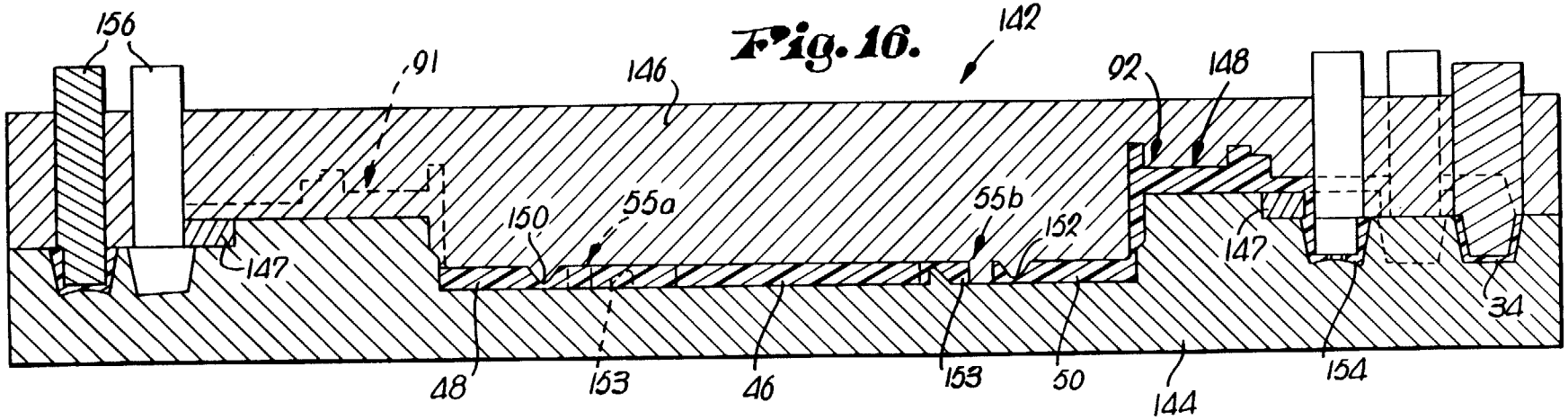
FIG. 16 is a vertical sectional view illustrating a preferred method of fabrication of a keyboard in accordance with the invention, with a keyboard blank being formed in a separable mold.

Referring now to FIGS. 16–19, a preferred method of fabrication of a keyboard in accordance with the invention is illustrated. In FIG. 16, a mold 142 is illustrated having a base section 144, an upper section 146, and a pair of separate comb-like elements 147. The mold 142 is employed to form a blank 148 used in the fabrication of a completed keyboard 30. The blank 148 includes a base 46 having respective sets 55a and 55b of apertures 56, 58 along spaced margins thereof, along with front and rear walls 48, 50 secured to the base margin along respective lines of weakness 150, 152. Each aperture 56, 58, includes a flexible section 153 at the inner face thereof permitting insertion of a corresponding dog 102 in the final fabrication process. In addition, the base 46 is molded to include all of the other described structure, e.g., the slots 60, 62 and flipper elements 70, 84. The arm sets 91, 92 are respectively secured to the margins of the walls 48, 50 remote from the base 46, and these arms are configured as described above. In addition, a pair of elongated spacer bar-supporting arms 120 are provided for the bar 34.

Figure 17:
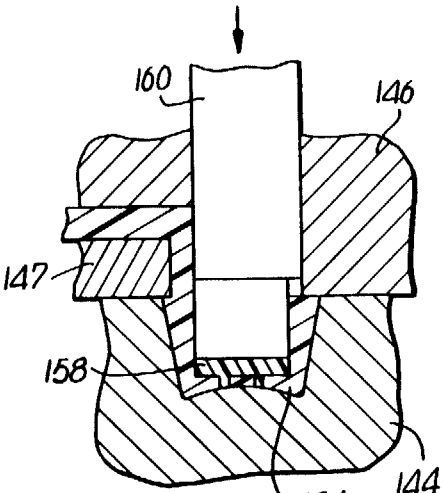
FIG. 17 is an enlarged, fragmentary vertical sectional view illustrating formation of a key letter in one of the key tops of the blank depicted in FIG. 16.

Respective keys 154 are integrally attached to the outermost end of each of the described arms. As best seen in FIGS. 16 and 17, the arms are secured to their associated keys 154 along one margin of the skirt thereof. A removable die block 156 is inserted through the upper mold section 146 and into each separate key 154. The die blocks 156 have, on their innermost ends, structure for forming informational indicia openings in the keytops. A separate filler block 157 extends through the section 146 and into spacer bar 34 as shown. Thus, during the molding process, letters or other appropriate indicia are formed in the upper surfaces of the keys by virtue of the presence of the die blocks.

Figure 18:
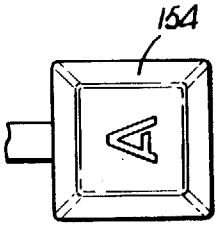
FIG. 18 is a top view of a completed key, shown with a letter formed therein.

It will be understood that a blank 148 can be fabricated using mold 142 and conventional injection molding techniques. When the initial injection is completed, the die blocks 156 are removed from their associated opening and keys, and a filler material 158 (see FIG. 17) of a different colored synthetic resin than that forming the main body of the blank is placed within each key body. A secondary block 160 is placed within the associated openings in section 146 and the keys 154, in order to press the material 158 into the indicia openings left by the die blocks 156. This serves to fill such openings and give a completed key top bearing the appropriate indicia thereon. FIG. 18 illustrates a completed key bearing the letter "A".

Figure 19:
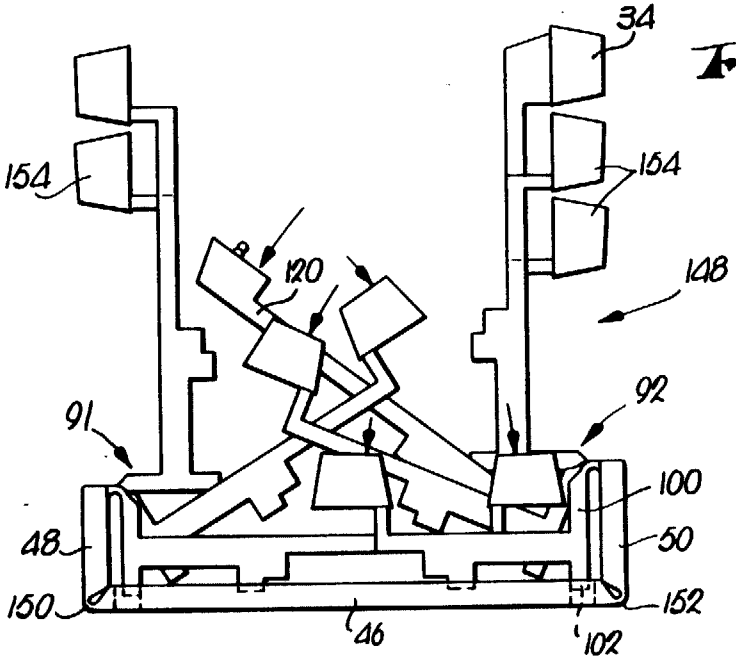
FIG. 19 is a somewhat schematic view illustrating the steps involved in formation of a keyboard from the blank depicted in FIG. 16.

In fabrication procedures, the blank 148 is placed on a work surface, and the walls 48, 50 turned upwardly relative to the base along the lines of weakness 150, 152 (see FIG. 19). The next step involves pivoting the respective arms of each set 91, 92 thereof downwardly until such arms are generally horizontal and parallel with base 46. At this point, the dog 102 associated with each arm is inserted within the underlying base aperture 56 or 58 (such being facilitated by the presence of the flexible sections 153), so that the arm is captively held for pivotal movement along a predetermined arc, as hereinabove explained. During such movement of the arms, they are intercalated as explained, and are oriented over the corresponding elements formed in the base 46. The final steps in the fabrication process involve shifting the arms 120 downwardly and interconnecting the same with the transversely extending spacer bar 34. The output means 38 can then be installed in the blank 148 in order to give a completed keyboard.

Figure 20:
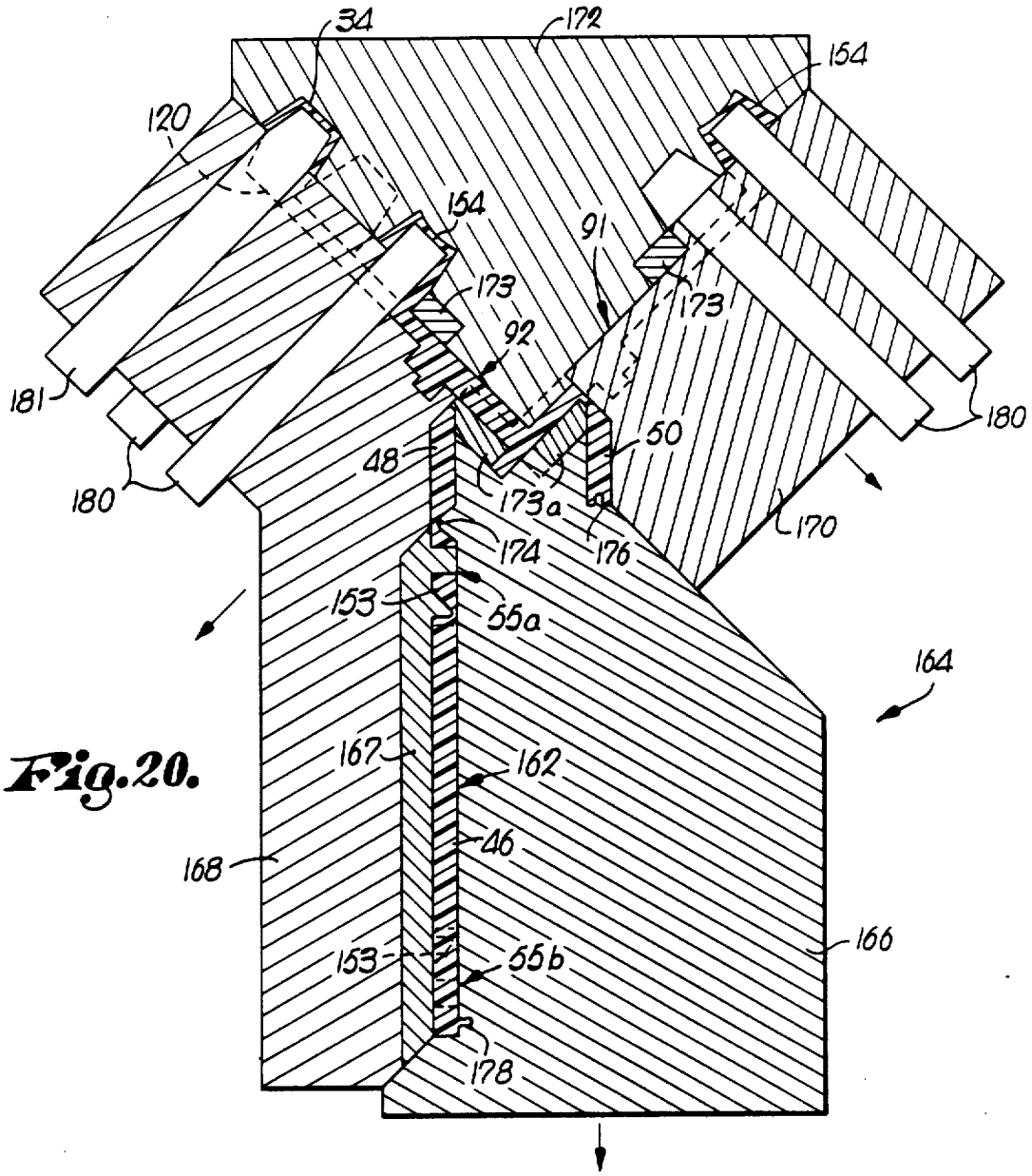
FIG. 20 is a vertical sectional view illustrating a multiple part, separable mold used in forming a synthetic resin keyboard blank.
Figure 21:
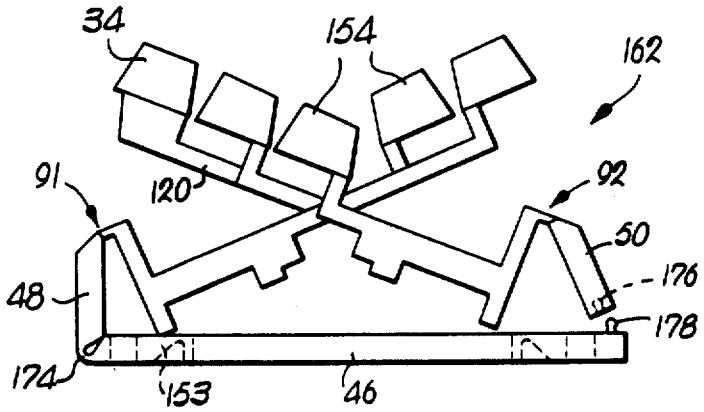
FIG. 21 is an essentially schematic view illustrating the steps involved in formation of a completed keyboard using the blank produced from the mold of FIG. 20.

FIGS. 20–21 illustrate a similar molding process for the production of a two-part blank 162. In this instance the mold 164 includes a pair of side-by-side interfitted base sections 166, 167, 168, along with a pair of upper sections 170, 172. A pair of elongated comb-like elements 173 are also provided, along with respective elongated inserts 173a. The blank 162 is molded to present a base 46 having a sidewall portion 48 secured thereto along a line of weakness 174. One set of arms 91 are secured to the end of wall 48 remote from base 46. The latter includes the aperture sets 55a and 55b, as well as the other described structure of the base including the slots, elements and flexible sections 153. The second set of arms 92 is also formed within mold 164 as a separate element between the upper portion of base section 168 and the lefthand face of upper base sections 172. The arm set 92 includes the sidewall 50 secured thereto, and the sidewall 50 and the margin of base 46 remote from wall 48 are provided with appropriate connectors 176, 178. The arm set 92 includes the elongated arms 120 and spacer bar 34. It will be seen that the apparatus of FIG. 20 serves to mold the respective arm sets 91, 92 in an intercalated condition so that upon final fabrication this procedural step is eliminated.

The keys 154 are formed simultaneously with the respective arms of each set 91, 92, as in the case of the embodiment of FIGS. 16–19. Here again, die blocks 180 bearing the appropriate key indicia, and filler block 181, are initially positioned within the mold sections 168, 170 as illustrated, so that the keys, when formed, include the appropriate indicia openings in the upper surfaces thereof. The respective keys 154 are completed as illustrated and described in connection with FIGS. 17–18, i.e., use of a material 158 having a different color than that of the main body of the keys 154.

The fabrication technique involves connecting the wall 50 to the margin of base 46 remote from wall 48, through use of the connectors 176, 178. The final step involves pivoting of the respective arm of the sets 91, 92 until such arms (which are already intercalated) are oriented as hereinabove described.

Although the keyboards in accordance with the invention have been particularly described as including various specific construction features, it will be appreciated that the invention is not so limited. To give but one example, a wide variety of devices can be employed for sensing movement of the resilient elements, and for in turn developing a keyboard output. Various known techniques utilizing electromagnetic radiation such as optical sensors can be employed in this context.

Furthermore, although in preferred forms the keyboards are described as being formed from synthetic resin materials, those skilled in the art will readily appreciate that other materials can be substituted. However, synthetic resins are preferred because of their low cost and ease of molding.

I claim:

1. A keyboard, comprising:

a plurality of keys;

shiftable means supporting said keys for individual, selective depression thereof *and comprising an elongated arm secured to each key respectively, and means mounting said arms for pivotal movement thereof some of said arms being of a different length than others of said arms;* an engagement surface operably coupled and shiftable with each of said keys;

an elongated, deflectable, resilient flipper associated with each key and having a striking portion and a rest position;

selectively actuatable means for generating an electrical output signal upon striking thereof and located adjacent said flipper striking portions;

means mounting each of said flippers for engagement thereof by the engagement surface coupled with said associated key, upon depression of the associated key, in order to shift said striking portion of said flipper away from said signal-generating means;

structure for releasing each of said flippers from the engagement surface coupled with the associated key, when the striking portion of the flipper has been shifted away from said signal-generating means a predetermined distance, each of said flippers being constructed and arranged for, upon said release thereof, rapidly and freely shifting the striking portion thereof toward said signal-generating means in a manner to overtravel the rest position of the flipper and thereupon strike and actuate said signal-generating means, and for thereafter shifting said flipper back to the rest position thereof after said striking and actuation of the signal-generating means, the duration of contact time between said flipper striking portions and said signal-generating means being independent of the duration of depression of the corresponding keys, said shifting of said flipper striking portion upon said release of the flipper being independent of any subsequent movement of the corresponding key,

*said signal-generating means comprising*

*electrical switch means including a plurality of electrically conductive elements operably associated with said keys for directly providing a unique, distinctive output signal for each of said particular keys upon depression thereof, the number of said elements being less than the number of said keys.*

[2. A keyboard as set forth in claim 1, said shiftable means comprising an elongated arm secured to each key respectively, and means mounting said arms for pivotal movement thereof.]

3. A keyboard as set forth in claim [2] *1*, each of said arms being oriented above the corresponding flipper.

4. A keyboard as set forth in claim [2] *1*, said flipper mounting means comprising structure for mounting of the flippers in a cantilever fashion, with said striking portion of each of the flippers being adjacent the end thereof remote from the cantilever mounting.

5. A keyboard as set forth in claim [2] *1*, the pivot axes of said arms being spaced from and above the corresponding arm.

6. A keyboard as set forth in claim 1, said shiftable means comprising a pivotal element operatively coupled to each of said keys, said release structure including a clearance surface adjacent said engagement surface, said engagement surface being configured, upon pivoting of the associated element, for clearing the associated flipper and allowing the same to move along said clearance surface to the rest position of the flipper.

7. A keyboard as set forth in claim 1, said signal-generating means comprising an elongated resistive wire, and a conductive element adjacent said wire, said conductive element being located for engagement by said striking portions of said flippers during said over-travel shifting thereof for causing the conductive element to impinge upon the wire.

8. A keyboard, comprising:

a plurality of keys;

means supporting said keys for selective depression and return movement thereof, including an elongated, generally horizontally extending arm secured to each key respectively, *some of said arms being of a different length than additional ones of said arms.* at least certain of said arms extending in a first direction, others of said arms extending in a second direction different than said first direction; and means mounting each of said arms for pivotal movement thereof about generally horizontal axes spaced from the associated key; and means for developing a keyboard output corresponding and in response to depression of particular keys,

*said output developing means comprising electrical switch means, said switch means including a plurality of electrically conductive elements operably associated with said keys for directly providing a unique, distinctive output signal for each of said particular keys upon depression thereof, the number of said elements being less than the number of said keys.*

9. A keyboard as set forth in claim 8, said keys being oriented in respective rows thereof, the arms secured to the keys of one row thereof extending in said first direction, the arms secured to the keys of another row thereof extending in said second direction.

10. A keyboard as set forth in claim 8, said first and second directions being substantially opposite one another.

11. A keyboard as set forth in claim 8, said mounting means comprising:

a pair of spaced, opposed, upstanding sidewalls respectively located adjacent the ends of said certain arms and said other arms remote from the secured keys;

pivotal connection structure pivotally securing the adjacent arm ends to said sidewalls; and means for limiting the pivotal travel of each of said arms to a predetermined arc.

12. A keyboard as set forth in claim 11, said axes lying in horizontal planes which intersect said arcs.

13. A keyboard as set forth in claim 11, said travel-limiting means comprising a dog carried by each arm, and structure defining a dog-receiving opening proximal to the base of the adjacent sidewall.

14. A keyboard, comprising:

a plurality of keys arranged in at least two proximal rows;

means supporting said keys for selective depression and return movement thereof, comprising an elongated, generally horizontally extending arm secured to each key respectively and having an engagement surface thereon, first arms secured to the keys of one of said rows extending in a first direction, second arms secured to the keys of another of said rows extending in a second direction generally opposed to said first direction;

means mounting said first arms for independent pivotal movement thereof about a first axis spaced from the keys secured to the first arms and above the first arms, and for limiting the pivotal movement of the first arms to a predetermined first arc, said first axis lying in a first horizontal plane which intersects said first arc; and means mounting said second arms for independent pivotal movement thereof about a second axis spaced from the keys secured to the second arms and above the second arms, and for limiting the pivotal movement of the second arms to a predetermined second arc, said second axis lying in a second horizontal plane which intersects said second arc;

means for developing a keyboard output corresponding to the depression of particular keys; and structure operably coupling said keys and output means, comprising an elongated, deflectable, resilient flipper for each of said arms and having a rest position;

means mounting first flippers associated with said first arms in a cantilever fashion with the free ends of the first flippers extending to a point for engagement by said surfaces on the first arms, when the keys mounted on the first arms are depressed, in order to deflect the first flippers;

means mounting second flippers associated with said second arms in a cantilever fashion with the free ends of the second flippers extending to a point for engagement by said surfaces on the second arms, when the keys mounted on the second arms are depressed, in order to deflect the second flippers; and structure for releasing each of said first and second flippers from the corresponding engagement surfaces when the flippers have been deflected a predetermined amount, and for thereafter permitting the flippers to return to the rest positions thereof, said output means including apparatus for sensing the movement of said flippers,

*said output means comprising*

*electrical switch means including a plurality of electrically conductive elements operably associated with said keys for directly providing a unique, distinctive output signal for each of said particular keys upon depression thereof, the number of said elements being less than the number of said keys.*

15. A keyboard as set forth in claim 14, said engagement surfaces being disposed above the free ends of the corresponding flippers.

16. A keyboard as set forth in claim 14, said release structure including a clearance surface adjacent said engagement surface, said engagement surface being configured, upon pivoting of the associated element, for clearing the associated flipper and allowing the same to move along said clearance surface to the rest position of the flipper.

17. A keyboard as set forth in claim 14, said apparatus comprising an elongated resistive wire, and a conductive element adjacent said wire, said conductive element being located for engagement by said flippers during said return thereof to their rest positions for causing the conductive element to impinge upon the wire.

18. In a keyboard:

an elongated *continuous* output member having a plurality of spaced electrical contact switch zones along the length thereof;

a plurality of *elongated* elements respectively associated with said switch zones, each of said elements having an contact switch area thereon configured for engaging the associated switch zone of said member;

means mounting said elements adjacent said output member *and transversely relative to the longitudinal axis of the output member,* with the switch areas of the elements being normally spaced from said associated switch zones;

means for selective movement of said elements such that the switch areas thereof contact the associated switch zones, said output member including structure for generating a respective electrical output signal in response to the contact of each of said element switch areas and the corresponding switch zones, said moving means including means for selectively shifting each of the element switch areas away from the corresponding associated switch zones, comprising a manually depressible key for each element, and means operably coupling each key and its corresponding element;

structure for releasing said element switch areas after the same have been shifted away a predetermined amount, each of said element switch areas being configured and arranged for return shifting back toward said associated switch zone and impact engagement of the associated switch zone, said return shifting and impact engagement being independent of the duration of depression of the corresponding key; and means operably coupled to said output member for determining which of said switch zones has been impacted.

*19. A keyboard, comprising:*

*a plurality of keys;*

*means supporting said keys for selective depression and return movement thereof,*

*including an elongated, generally horizontally extending arm secured to each key respectively,*

*at least certain of said arms extending in a first direction,*

*others of said arms extending in a second direction different than said first direction; and*

*means mounting each of said arms for pivotal movement thereof about generally horizontal axes spaced from the associated key; and*

*means for developing a keyboard output corresponding and in response to depression of particular keys,*

*said output developing means comprising electrical switch means, said switch means including a plurality of elongated, electrically conductive elements operably associated with said keys, said elements lying within an elongated zone oriented generally transverse to the longitudinal axes of said arms, said zone having a width substantially less than the length of said arms.*

*20. A keyboard as set forth in claim 19, said plurality of elements being a pair of said elements.*

*21. A keyboard as set forth in claim 19, said zone being beneath said arms.*

*22. A keyboard as set forth in claim 21, said zone being located between each of said keys and their associated pivot axes.*

*23. A keyboard as set forth in claim 8, said plurality of elements being a pair of said elements.*

*24. A keyboard as set forth in claim 8, said elements lying in an elongated zone oriented generally transverse to the longitudinal axes of said arms, said zone being located beneath said arms.*

*25. A keyboard as set forth in claim 24, said zone being located between each of said keys and their associated pivot axes.*

*26. A keyboard as set forth in claim 25, each of said arms including integral operating structure for operating said switch means upon depression of the respective key supported by the arm.*

* * * * *